June 22, 1937.   J. F. HUNTER   2,084,958
LIQUID SEPARATION METHOD AND APPARATUS
Filed July 16, 1935   4 Sheets-Sheet 1

INVENTOR:
James F. Hunter
BY Morrison, Kennedy & Campbell
ATTORNEYS.

June 22, 1937.  J. F. HUNTER  2,084,958
LIQUID SEPARATION METHOD AND APPARATUS
Filed July 16, 1935  4 Sheets-Sheet 2

INVENTOR:
James F. Hunter
BY
Morrison Kennedy & Campbell
ATTORNEYS.

June 22, 1937.    J. F. HUNTER    2,084,958
LIQUID SEPARATION METHOD AND APPARATUS
Filed July 16, 1935    4 Sheets-Sheet 4

INVENTOR:
James F. Hunter
by Morrison, Kennedy
& Campbell, ATTORNEYS.

Patented June 22, 1937

2,084,958

UNITED STATES PATENT OFFICE 2,084,958

LIQUID SEPARATION METHOD AND APPARATUS

James F. Hunter, New Rochelle, N. Y.

Application July 16, 1935, Serial No. 31,556

20 Claims. (Cl. 210—43)

This invention relates to liquid separation method and apparatus. It is illustratively shown as applied to the separation of tars and oils out of waste liquors composed largely of water, typically represented by the effluent water used for sealing and other purposes in the manufacture of carbureted water gas. These liquid constituents, in hot and fluent condition, are combined both as simple mixtures and as emulsions. By this invention water is recoverable which is sufficiently free from the other component liquids to be used over again in the gas-making process; and the various mixtures and emulsions are broken down so that the tar and oil components, or combinations of them, existing in the liquor may be taken off separately, or else recovered as a tar-oil mixture, and utilized, for example for fuel. The invention however is applicable to other industries where there is involved the need of analogous separation of immiscible liquids and the breaking down of emulsions thereof.

This application is a continuation in part of, and a substitute for, my prior application Serial No. 541,804, filed June 3, 1931, allowed January 21, 1935.

Emulsions may be considered as intimate mixtures of finely divided or minute particles of the component liquids held in suspension mechanically as distinguished from chemically, namely, by viscosity of one or more of the liquids causing stagnation against free separating flow of the particles, or by surface tension or surface adhesion of the minute particles, perhaps accentuated by the presence of minute dust particles or other causes. The gas process effluent contains tars and oils varying in gravity throughout the range from those which will sink rapidly to those that will float on the water, and as well emulsions of tar and oil with water. The tar exists in relatively large masses carried along and surrounded by the water, and each mass is thereby maintained as a separate entity, but itself containing smaller portions or inclusions of the lighter constituents.

The general objects of the present invention include the separation from the water of the other liquids, specifically tar and oil, so that the water is again usable or suitable for re-circulation; also the breaking down of emulsions, and the separation of the lighter liquids as water from the heavier or tar, so that there is required little or no further processing to prepare the heavy by-product or tar for sale or for boiler fuel. Other and further objects and advantages of the present invention will be explained in the following description of an illustrative embodiment thereof or will be understood by those conversant with the subject.

Under previous methods of separation, as practically used, the tars are attempted to be separated out from the circulating water or effluent by decantation, involving a slow and gentle flow during simple settling of the heavier constituents. The tar emulsions thus recovered from the effluent however are not usable as they carry from fifty to eighty percent by volume of water, and must be supplementally processed, by steps including raising to high temperature, and at great expense, to reduce to a negligible proportion this water content. In this processing some emulsions refuse to break and settle by decantation at temperatures obtainable under atmospheric pressure, and the water can only be driven off by actual boiling. Thus, great troubles have been encountered in the handling of the effluent, which can not be simply discarded or run into natural waters on account of pollution.

The method and apparatus of the present invention provide a simple, rapid and inexpensive means of substantially complete separation of constituents, which has demonstrated itself as of high practical value and efficiency, in the handling of the hot effluent of the gas process.

Water-gas tars are hydrocarbons, produced in the cracking of the oil used for carbureting blue gas, and which condense and drop out as the gas is cooled. The gas-making process is an intermittent one. At the beginning of each gas-making period the temperature in the gas-making plant is higher than is required for cracking the particular oil being used, and at the end of the gas-making period the plant has given up heat to the oil vapors and the temperature of the apparatus is lower than is required for cracking the oil. The condensable products vary from those produced by over-cracking the oil to those produced by under-cracking the oil, or in other words, through the whole range from a readily separable tar having a specific gravity of 1.3 or over to an oily tar lighter than water, or light oils. All of these constituents are included in the effluent which is to be treated according to the present invention.

The method improvement of this invention, in its complete aspect, involves two distinct major steps. The first step will be called the "mixing" operation, in which all the tars from the various sources and of varying gravities, in their hot condition are reduced or attenuated and brought into mutual contact, whereby they can readily coalesce and produce a more homogeneous tar; and during this step the larger particles of water are liberated from the tar bodies. The second major step or operation may be called the "separation" step, and it comprises the sub-operations of "agglomerating" and "dehydrating" the tarry constituents, in which operation practically all of the tar is separated or classified out from the effluent water, and practically all remaining water is removed from the tar masses or drops as they coalesce into growing bodies. The described operations are carried on continuously and in quick succession, so that heat losses from radiation etc. are minimized, and the constituents maintained hot and fluent. The temperature of the separating apparatus and operation is further maintained by the heat of the recovered circulating water used in a water jacket.

After passing the mixing and entering the separating stage or apparatus the tar component, which is now in a modified form, greatly improved for the separating step, and of enhanced specific gravity, will sink readily out of the entraining water. Even in cases where the principle of simple decantation is used the results may be greatly improved by combining consecutively the described mixing step and separation by decantation; and it is intended to cover the process in this broad aspect.

In the accompanying drawings

Fig. 5 is a top plan view of the apparatus shown in Fig. 1.

Fig. 6 is a partial top plan view, and Fig. 7 a front elevation thereof, of a portion of a water-gas manufacturing plant, diagrammatically shown and corresponding generally with said prior application.

Fig. 8 is a diagram view showing the character of the liquid or effluent to be treated; while Fig. 9 is a similar diagram showing the action upon such liquid as takes place in the mixing device; and Fig. 10 is a similar diagram showing the subsequent action thereon in the separating part of the apparatus.

Fig. 11 is a partial sectional elevation of a modified form of scroll element, corresponding with said prior application.

Fig. 12 is a partial top plan view and Fig. 13 a sectional elevation of a modified form of separating apparatus.

Fig. 14 is a horizontal section taken on the line 14—14 of Fig. 12.

Fig. 15 is a sectional elevation showing the mode of supporting the apparatus of Figs. 12–14.

Figures 1, 2, 3, 4:
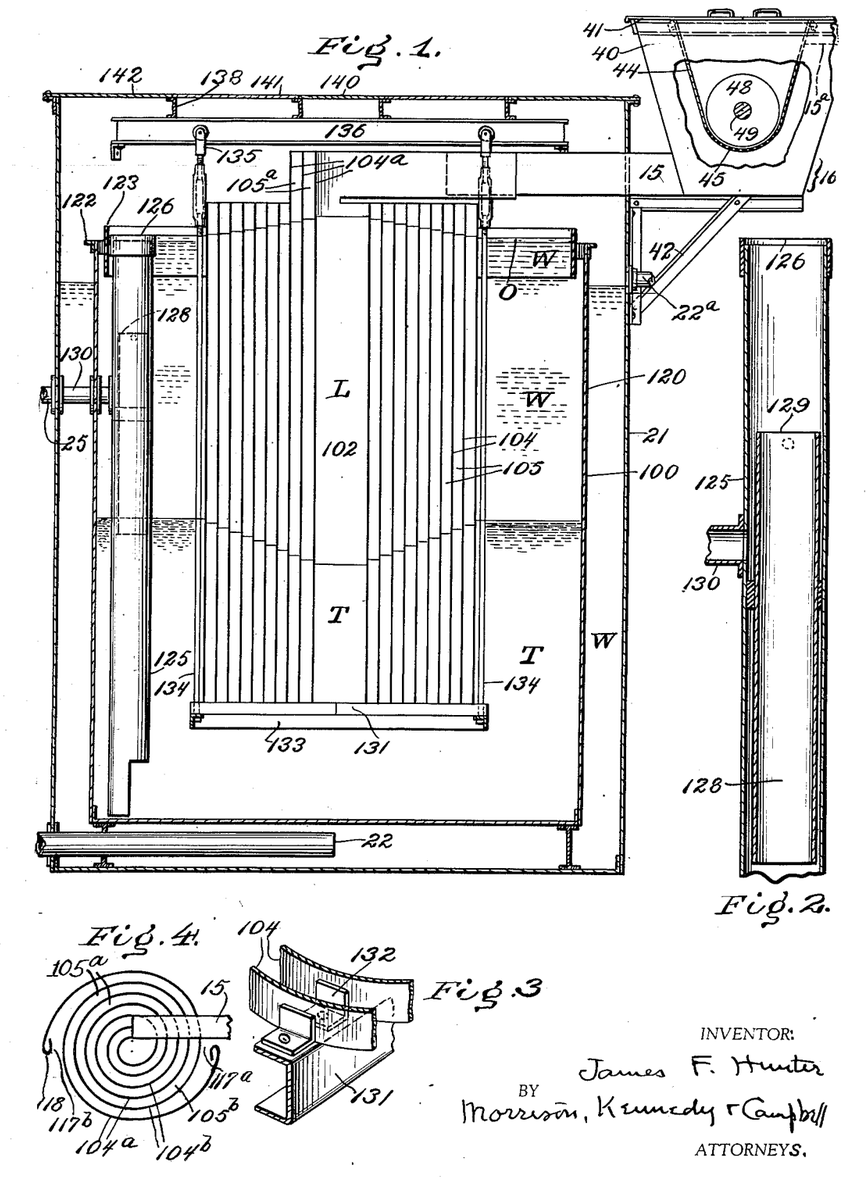
Figure 1 is a vertical central section of an illustrative form of apparatus embodying the present invention.
Fig. 2, on a larger scale, is a vertical section through certain outlet pipes.
Fig. 3 is a perspective of a constructional detail of the mounting of the scroll element.
Fig. 4 shows in plan view diagram a modification of the scroll arrangement shown in Fig. 5.
Figures 5, 6, 7, 8, 9, 10:
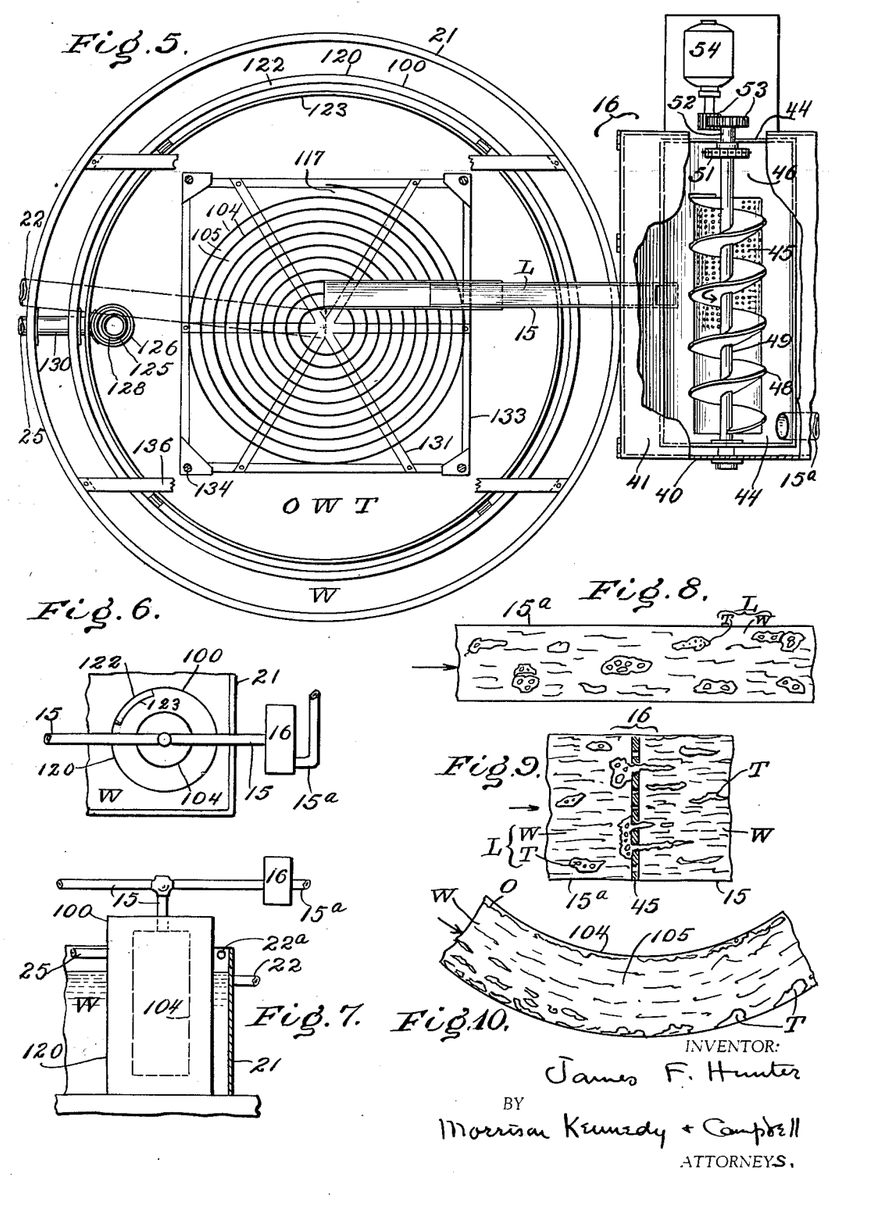
Figures 11, 12, 13, 14, 15:
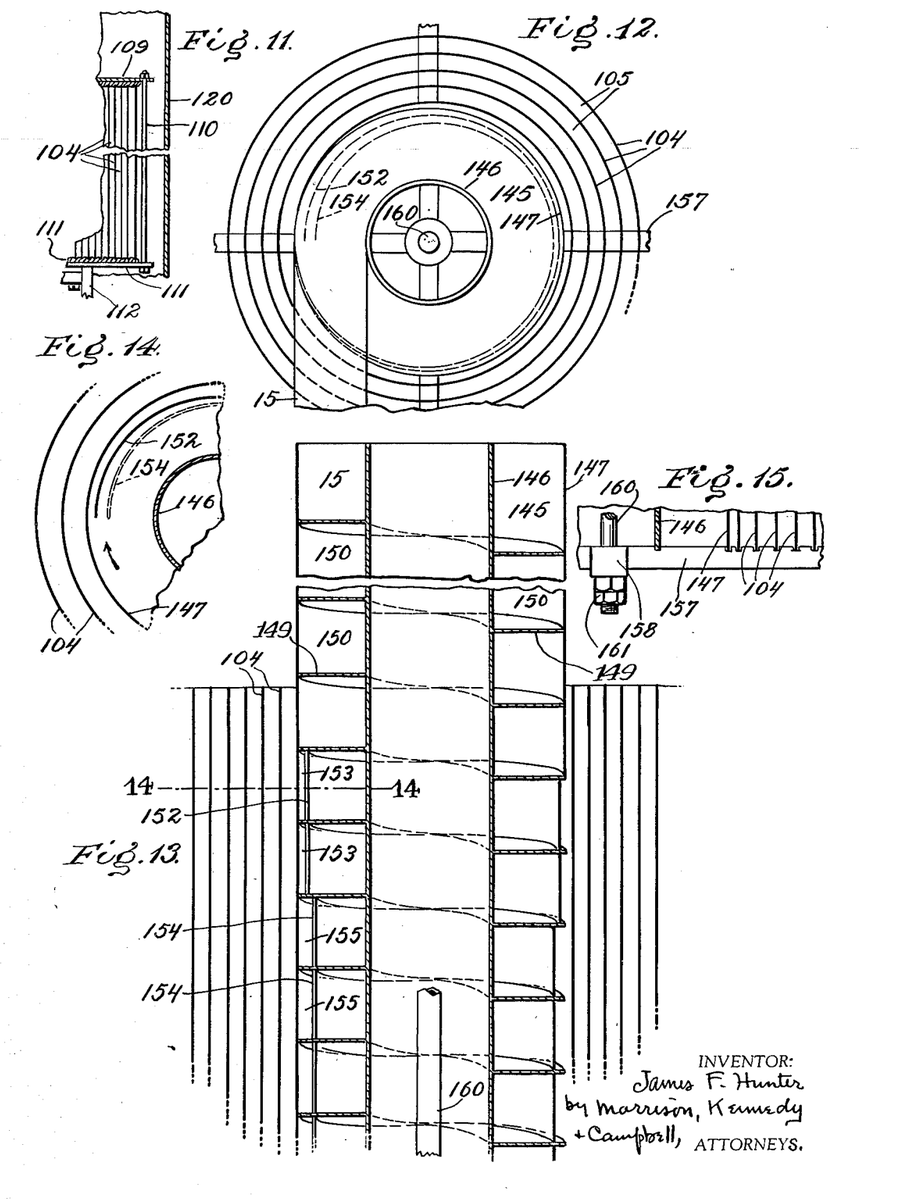

Referring first to Figs. 6 and 7, these show arrangements suitable for a water-gas manufacturing plant, and correspond in part with Figs. 1 and 2 of said prior application. A pipe 15ª is shown which may lead from the seal pot of the gas plant, carrying the hot overflow liquor to the mixing element or device 16. From this point the modified liquor or effluent is carried by a pipe or trough 15 to the separator 100 or to a number of such separators, the pipe 15 being shown extended for that purpose. The separator is located closely beyond the mixer 16, minimizing cooling of the hot liquor. The separator 100 is shown as immersed within a reservoir or outer vessel 21, which in fact carries the separated hot water and thereby serves as a water jacket for maintaining the temperature within the separator. A water circulation outlet 22 is shown from the reservoir, and leading for example to the gas plant for reuse. When the water is in excess it may overflow the reservoir to waste or elsewhere by a pipe 22ª. Without at this time describing fully the separator, it comprises a tank 120 within which the separating element or scroll 104 is contained, a wall or dam 123 being arranged in a partly immersed condition to exclude oil from the water overflow, which takes place over a weir 122 at the edge of the tank 120. Fig. 11 shows in part the same form of separator as in said prior application, with an immersed scroll or spiral duct 104 closed by a bottom plate 111 and top plate 109, with long holding bolts 110 from cover to bottom, the scroll resting on a support or buck 112 in the bottom of the tank 120; its operation will be clear from the description of the more completely shown scroll of Figs. 1 to 5.

Figs. 1 to 5 show in greater elaboration an embodiment of the essential features of the present invention; these being similar in general principle to Figs. 6, 7 and 11 but improved in construction and operation from the particular design illustrated in said prior application. Before describing the structural details the operations or steps of the process hereof may be explained in connection with the diagrams Figs. 8 to 10.

Fig. 8 represents a portion of the passage or pipe 15ª leading to the mixer 16, and indicates the hot effluent or liquor L flowing therethrough, comprising portions or bodies of tar T entrained in the hot water W; the tar masses containing embedded bodies or globules of water, thus reducing their specific gravity and preventing effective separation by decantation. Fig. 9 shows in principle the so-called mixing operation, in the mixer 16, this resembling a straining action; in fact this step does strain out hard or rigid bodies; but in addition it effects the mixing step hereof whereby the tar masses, lumps or clots are put through the small perforations of the mesh screen, grating or strainer 45, as shown, thus reducing, subdividing or shredding these masses, squeezing out and releasing the larger imprisoned portions of water, and wholly altering their character; so that the several constituents become thoroughly mixed, and the lighter tars are brought to a gravity which causes them to sink readily, and are thus in the best condition for the separating step.

Fig. 10 indicates in rough diagram the separating step, the free mixture of constituents being passed through a walled passage of narrow width, substantial height and relatively great length, with extensive curvature of travel, under sufficient head and speed of flow to cause the heavier or tar bodies or portions T to shift centrifugally to the outer wall and by local action or turbulence rub or roll along and by progressive coalescence agglomerate into bodies of increasing size, and at the same time to release from such bodies, by such rolling action or working movements, any small particles of water remaining enveloped therein; whereby the specific gravity of the tar masses is progressively increased, thus bringing about progressive gravity classification during the travel along such passage, with an action which accelerates as the tar bodies increase in size and specific gravity, until finally the classified constituents are flowed out by different outlet passages as will be later described. In this operation the water W occupies the middle portion of the flow passage while the lighter ingredients or oils O trend toward the inner wall of the passage as indicated.

Figs. 1 and 5 show the pipe 15a bringing the hot liquor to the mixer 16, from the outlet of which it flows by the passage or open trough 15 to or near the central chamber of the duct or scroll 104 of the separator 100. The separator comprises the tank 120 in which the scroll is immersed, and the tank is shown as immersed in hot water in an outer vessel or reservoir 21 from which water may be drawn by a recirculation pipe 22 or from which excess water may overflow by a pipe 22a determining the water depth in the reservoir. Because of the rapid separation permitted by this invention, the total water in the system can be reduced to an unusually small quantity, which results in frequent recirculations to the gas plant, and consequent high temperature of the effluent, which in turn facilitates the described handling of the tars, and freeing them of water.

Describing Figs. 1 and 5 in detail, the mixer 16 is shown in an advantageous form comprising an outer or collecting tank 40 having two hinged covers 41 and resting on a bracket 42. The mixing element, in the nature of a strainer or perforated wall 44, is illustratively shown as composed of sheet metal bent to the form of a trough 44 and removably hung within the mixer tank 40. The operative portion of the wall 44 is its perforated area 45, formed for example with many small holes; the perforations extending for the full length of the worm to be described and preferably for the full curved extent of the perforated wall, but not above the point of tangency. The inlet pipe 15a delivers into the perforated mixer trough 44 at one end, and the trough at the other end has an unperforated extension 46 whereat accumulated solid material as coke or carbon may be occasionally removed. The diameter of the perforations should be as small as consistent with practical conditions, and may be as small as $\tfrac{1}{32}$ inch more or less for treating tar-water mixtures.

Rather than relying upon a simple mixing or straining action as in Fig. 9 disclosed, it is preferred to effect a forced passage of the liquor through the perforations of the mixing strainer. For this purpose there is illustratively shown a worm 48, in the nature of a helical blade or wiper, mounted on a horizontal shaft 49 turning in bearings on the walls of the tank 40, the worm being set down into the perforated trough, with its peripheral portions or convolutions preferably slightly clearing the perforated wall, for example by a clearance about the same dimension as the diameter of the perforations, or preferably somewhat less. The turning of the worm thereby progressively spreads out the tar masses in a thin sheet over the perforated area, and the tar is forced through the perforations by the weight of the water. The collecting tank beneath receives the water and reconditioned tar, and the liquor, thus modified, passes on to the separator. Solids and unstrainable matters are forced along into the extension 46 for suitable removal. For driving the worm there is shown a sprocket chain 51 extending from the worm shaft upwardly to a short counter shaft 52 connected by reduction gearing 53 with the shaft of a motor 54.

Coming now to the separator 100, this comprises the spiral walled duct or scroll 104, already mentioned, immersed in the liquids in the tank 120 which in turn is immersed in the reservoir 21. The scroll has a central vertical chamber 102, which may be in communication with the channel or passage 105 in the scroll. The pipe or trough 15 may deliver the liquor into the chamber 102, or preferably tangentially into one or more of the convolutions of the scroll. Thus as shown in Figs. 1 and 5 the inner three convolutions are extended upwardly at 104a thus forming extensions 105a of the enclosed channels, and the passage 15 delivers the liquor tangentially into these channels, thus promoting the curved or spiral flow which is characteristic of the separating action. The separating scroll has its final convolution delivering by an exit 117 into the body of liquid in the tank 120, the several liquids having in the meanwhile become classified, the heavy tar below, the water floating thereon, and a small proportion of oil overlying the water, as indicated in Fig. 1, this classifying action continuing in the tank to the points of drawing off the several liquids. The tank is thus the final part of the classifying duct.

The described scroll arrangement may be varied; for example in Fig. 4 there are two spiral scrolls 104a and 104b forming alternate convolutions and enclosing passages 105a and 105b, both receiving from pipe 15, but delivering respectively at 117a and 117b; and the terminal of each scroll is bent back upon itself forming a vertical cavity 118 adapted to trap any heavy materials that have not been completely classified and permit them to run down to the proper stratum. The scroll or duct may take various forms, for example, the flow might be reversed, and progress inwardly to central outlets; the duct wall may be wavy; the passage width may be varied, etc.

The scroll as shown in Figs. 1, 3 and 5 is preferably open both above and below, contrary to said prior application, the lower portion of the scroll being preferably effectively sealed by immersion of its lower end in the tar stratum, as shown, preventing bypassing and remixing of the separated tar and water. The accumulating water may overflow from tank 120 to reservoir 21 by a weir or dam 122 which as shown comprises the entire circumference of the tank, rather than only a small extent thereof as in said prior application. To exclude the light oils from overflowing at 122 with the water there is shown a partially immersed wall 123, operating as a dam, below which water may flow to the weir 122; the wall 123 being a complete annulus, contrary to the short extent thereof in said prior application. The oil might be drawn off independently from within the dam 123 but is herein shown as drawn off by the same final outlet as the tar, as will now be described.

Immersed in the liquids in the tank 120 is an upright pipe 125, its lower end immersed well below the tar level and receiving tar, which rises through the pipe to the level of the final tar and oil outlet 25 to be referred to. The tar readily rises to this height under the combined head of water and tar outside of the pipe. The light oil overlying the water may be caused to enter the pipe 125 by the action of an adjustably threaded weir or nipple 126 applied at the top end of the pipe 125 with its upper edge somewhat higher than the water weir 122, so that only the excess light oils above the water, and not the water, may overflow the weir 126 into the pipe 125.

The tar pipe 125 and oil weir 126 are shown on larger scale in Fig. 2, and the control of the tar delivery is shown as effected by an inner pipe 128, adjustable vertically within the pipe 125, its top edge or weir 129 serving as an overflow, the tar rising within the pipe 128 and overflowing outwardly at 129 to join the oil overflowing the weir 126, the two liquids passing out from the pipe 125 by a common exit pipe 130 which passes also through the wall of the tank 120 and connects with the final tar and oil outlet 25 already mentioned. The combined tar and oil thus delivered may be variously treated, for example, by using them for fuel in the gas plant.

The mounting of the separating scroll 104 in the tank 120 may be by suspension rather than resting it upon the bottom as in said prior application. A spider 131 is shown on which the scroll directly rests, with small cleats or angle pieces 132 for positioning the convolutions. This supporting system is mounted in a frame 133 which is suspended from above by bolts or rods 134, each adjustable as by a turnbuckle. Each of the supporting rods is shown as having a head 135 adapted to slide or roll along tracks 136, that may have their ends mounted at the inner sides of the reservoir 21. This allows side shifting of the scroll if access to the tank is desired at one side or the other, for cleaning or other purpose. On top of the tracks are shown cross beams 138. Overlying the reservoir and resting partly on said beams 138 is a system of removable covers, namely a center cover 140 surrounded by an annular cover 141 and outside of that another annular cover 142.

As an illustrative example of a separation apparatus to handle say 1000 gallons per minute of effluent liquor, containing mostly water, with tars as heavy as 1.16 or 1.30 specific gravity and oils as light as .90, the scroll or spiral-duct may be 10 to 12 feet high, with convolutions spaced for channels of 1 to 1½ inches wide and of length 50 to 100 feet, more or less. The liquor flowed into the duct may rise to a head above the level in tank 120 sufficient to maintain flow velocity of 30 to 60 feet or more per minute. The tar level varies according to conditions but rises somewhat from the central to the peripheral portions of the duct; while the weirs 129, 122 and 126 control substantially steadily the levels respectively of tar, water and oil. The open bottom of the scroll affords quick delivery of the settling heavy component or tar to the body thereof maintained in the tank; and this is true when the tar level has either not risen to the scroll, as when starting operations, or when the tar is up to a sealing height as shown. The data stated are to be varied according to the character of the liquor, its content of heavy liquid or tar, the viscosity thereof, the necessary velocity and total flow rate and other practical conditions.

The particular form of walled passage or scroll shown in Figs. 1 and 3 has an open bottom, being only closed or sealed below by its immersion in the accumulated heavier liquid or tar, while that in Fig. 11, as already described, shows the scroll closed or floored by a bottom plate, and closed also above. An advantageous arrangement is a combination wherein the scroll or passage at the bottom is closed or floored for a part of its extent, for example for the first few convolutions, and therebeyond sealed by the settled tar. The head of the overlying water is greatest near the center, where the depth of tar is lowest; so that the described closing of the first few convolutions reduces the necessary depth of sealing and thus permits a reduction of the total height of the scroll and of the tank in which it is immersed. With such arrangement the scroll is advantageously left open on top, providing easier access for cleaning.

By way of further specification of the structure and operation of the invention the following explanations are made. Referring to the mixing strainer 16, the total area of the perforations 45 should be proportioned to pass the maximum quantity of effluent under an accumulated head in the trough of less than the diameter of the wiper, so that normally the wiper blade projects above the liquor. For a reduced rate of operation the perforated area may be reduced as by closing plates applied to the underside. The mixer perforations, of the order of $\frac{1}{16}$ inch, are preferably punched in thin metal, which affords a slight taper, the smaller diameter being placed next to the helical wiper. The hinged doors 41 give access for cleaning the perforated wall without interfering with operation. If the trough should overflow by failure to keep clean the perforations the overflow will pass into the collecting tank and thus avoid interference with the gas-making process.

The mixture-emulsion may be considered as containing tars of varying viscosities and specific gravities, in various combinations with water. Some bodies or combinations are of indifferent flotation, i. e. of gravity nearly that of water, and not readily classifiable. In the perforated mixer the various tars undergo a mixing, due to the more viscous ones traversing the perforations more slowly than the others, causing mutual contact and coalescence. The bodies of indifferent flotation are carried down by the water stream to join those on the screen.

The helical wiper blade 48 is preferably rotated at a slow speed while the tar, water and oil mixtures from all sources are introduced into the trough. Tar masses which do not float would either sink or be carried down by the water flow into contact with the perforated area of the trough, where they are acted on by the wiper and distributed over the perforated area by the forward motion, which causes mixing by rolling the masses along the plate, and by the sliding motion caused by the rotation. The upper edge of the wiper being above water comes in contact with any floating oil or tar particles, picking them up by adherence and carrying them down for mixture with the tar on the perforated plate; tar and oil have sufficient affinity to remain in combination.

At the screen thus occurs the intercombining of the various tars by their spreading in a film over the surface so that their passage through the perforations is in states of improved specific gravity.

Along with this operation of bringing the various tar and oil portions upon the perforated trough plate the film of material thus produced is being forced through the perforations by reason of the weight of the superimposed effluent. A large part of the water bodies entrained in the tar masses have been broken up and the water liberated by the double motion, forward and sliding, produced by the wiper. In passing through the perforations the remaining water bodies are largely released, so that the tar masses pass into the collecting tank with only minute particles of contained water. The passage of the tar masses through the perforations changes them from a relatively small number of large masses to a large number of small masses. This mixing action includes a shredding as indicated in Fig. 9, and thereby tar masses which have widely varying gravities, and largely freed of contained water, have been brought together, with the result that largely or wholly the resulting tar shreds or drops leaving the mixer are heavier than water, so that the effluent has thus been brought into prime condition for the immediate following separation step including agglomeration and final dehydration of the tar masses.

Following immediately the described mixing operation is the separating operation, including the agglomerating and the dehydrating of the tar masses contained in the conditioned effluent from the mixer. The contained tar is in the form of many small shreds or drops entrained in the surrounding water, or agglomerations thereof, all heavier than water and therefore well adapted to be separated out. This effluent is passed through the described scroll or spiral duct of substantial height, extensive length and relatively narrow width. Due to the curvature of the scroll and the velocity of flow the tar particles are all brought by centrifugal action into contact with the outer or concave wall of the spiral duct. The tar particles adhere to these walls and are thus spread out and carried along by the force of the water flow, in a series of tar waves that move ahead with varying velocities depending upon viscosity and the degree of dehydration. The action may be compared to that of wind upon a sand dune, the surface of each tar wave being moved along by the water action, so that all portions of the tar are successively and repeatedly exposed to the water action. The tar movement may be described as a rolling or kneading action, and during this progress the minute entrained particles of water are brought into mutual contact to coalesce into larger drops until finally ruptured by the continuing movement and the action of the water stream, thus liberating the contained water into the general flow. During these progressive dehydrating actions the tar deposits are increasing in specific gravity, and at the same time with their advance through the duct are flowing downwardly, so as practically completely to be deposited in the tar stratum that seals and forms the bottom of the duct before reaching the scroll exit 117.

Control of the velocity and time of passage of the effluent through the scroll may be effected in several ways. The greater the head between the center and the outside of the scroll the greater will be the velocity. A greater supply of effluent will raise the head and thus increase velocity. This operation can be assisted by adjustably lifting or lowering the scroll, namely by shortening or lengthening the rods 134 which suspend it; the higher the scroll the greater the head which can be produced. The capacity of the scroll and therefore the velocity of travel through it may also be adjusted by varying the tar level in the tank 120. By lowering the interior sleeve 128 and the tar weir 129 the tar level in the tank tends to lower, thus in effect increasing the height of the scroll ducts above the tar level, and permitting a greater total flow of effluent through the scroll, at the same velocity.

In Figs. 12 to 15 is shown a modification of the means of introducing the hot effluent into the separating scroll. Instead of the simple central chamber 102 of Figs. 1 and 5, there is shown an annular chamber 145 contained between an inner cylindrical wall 146 and an outer cylindrical wall 147, all located inside of the innermost convolution of the spiral duct or scroll 104, but standing up somewhat higher than the top of the scroll to afford an increase of head. The space within the inner cylindrical wall 146 may be considered as an idle space. The pipe or trough 15 which brings the effluent to the scroll is shown as delivering tangentially into the upper part of the annular chamber 145. In order that the liquor may maintain or accelerate its rotary travel as it descends to the scroll, the annular chamber is shown as occupied by a helical wall or baffle 149, partitioning the annular chamber into the successive convolutions of a descending helical passage 150.

The annular walls 146 and 147 and the helical channel 150 therein are shown as laterally closed for a certain distance below the top of the scroll, but therebelow, at one side, certain or each of the helical convolutions is provided with a peripheral exit into the surrounding scroll. Thus at each of two successive levels there is shown a wall 152 spaced slightly inwardly of the wall 147 and forming therewith a mouth or take-off passage 153, of relatively narrow width. Said mouth is so arranged, as will be clear in Fig. 14, as to skim off the outer or heavier layer of liquid, mostly tar, and deliver it circumferentially into the innermost scroll convolution, at this high level. This ensures that the tars will have extended travel along the spiral duct and not sink into the settled tar stratum before maximum dehydration.

Below the narrow take-off mouths 153 the following convolutions are provided each with a wall 154 so spaced as to form a wider passage or mouth 155 into the innermost scroll convolution, and similar take-off passages may be provided clear down to and below the top level of the tar stratum in the tank. These wider entrances to the scroll carry principally water thereto, with some tars, but the greater part of the tars make their entry at the higher levels indicated, the narrow passages 152 selectively extracting the tars from the descending effluent by reason of the centrifugal action in the helical channel. With this described combination of the downwardly trending helical inlet channel and the upright scroll or spiral duct, the tars are delivered from the channel into the scroll in contact with the concave side of the scroll passage wall, which wall is a continuation, at each mouth, of the outer wall of the inlet channel, as shown in Figs. 12 and 14, such tar delivery being near the top of the scroll passage. The action of this arrangement is that the heavier tars, at first in contact with the outer channel wall, continue and flow along the wall of the spiral duct or scroll initially at a high level, spreading out as they advance and with a descending trend so that finally they are delivered into the tar accumulation in the bottom of the tank. With this arrangement the extent of travel in the scroll necessary for the described agglomeration and dehydration may be reduced. The scroll may either have its lower end immersed and sealed in the tar stratum in the bottom of tank 169 shown in Fig. 17, or it may be spaced above the tar stratum, as may be required in particular cases according to the viscosity of the tars being treated. When the scroll is tar-sealed the lighter liquids must advance horizontally to the end of the scroll, so that the tars, descending the wall, are compelled to cross the stream of onward flowing lighter constituents.

With the type of scroll of Figs. 12–15 the mounting thereof may advantageously be as shown. A spider 157 gives underneath support to the scroll and to the walls 146 and 147 of the helical channel. Through the hub 158 of the spider extends a supporting rod 160 upon the lower end of which the spider is vertically adjustable by holding nuts 161. At the upper end of the scroll convolutions there may be a top spider 159, indicated in Fig. 17; it may be analogous to the bottom spider, and such top spider may be employed in connection with the embodiment of Figs. 1 and 5 as well as that of Figs. 12 and 13.

Figure 16:
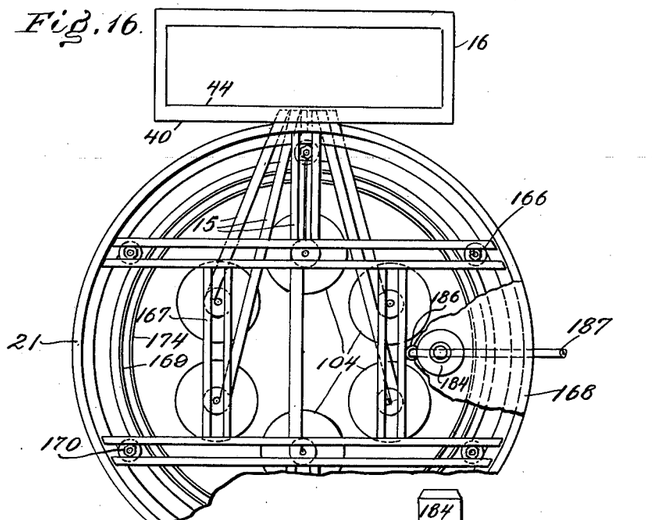
Fig. 16 shows in top plan view a form of apparatus containing a plural number of separators.
Figure 17:
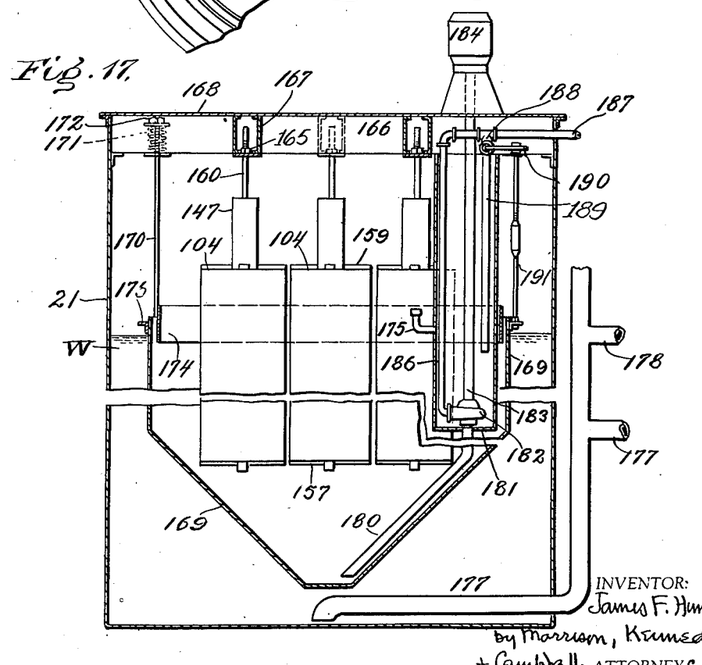
Fig. 17 is a sectional elevation thereof.

Figs. 16 and 17 show a complete apparatus with a plurality of scrolls, each of which is shown of the form of Figs. 12–15. The central suspending rods 160 are shown as having heads or nuts 165 at their upper ends, overlying the lower flanges or plates of a system of long hollow beams 166 and shorter cross beams 167. Six scrolls 104 are shown hanging as described from the system of beams. Overlying the beams is a cover 168 to the outside vessel or reservoir 21 corresponding to that shown in Figs. 1 and 5. By having a number of scrolls, more or less of them can be put into operation, according to the rate of supply of effluent to be treated, thus preserving optimum operation and flow velocity in each scroll. The several troughs or conduits 15 supplying the scrolls take off from the tank 40, and should be arranged so that uniform distribution of water and tar to the several scrolls will be maintained as nearly as possible.

The tank 169 in which the scrolls are partly immersed and which in turn is immersed in the reservoir 21 is shown as of hopper form, with its lower sides converged centrally. The tank 169 is shown as resiliently suspended from the beams 166 by means of suspension rods 170, the upper ends of which are surrounded by springs 171 upon which rest the heads 172 of the rods. This spring suspension permits a slight vertical self adjustment of the tank in accordance with the proportion of heavy liquid or tar contained therein, which may be utilized for control purposes as will be described.

In the upper part of the tank 169 is an annular dam 174 which prevents oil from overflowing with the water at the edge of the water weir 176. The oil accumulates on top of the water within the dam 174 and may be drawn off at desired intervals manually or otherwise, there being shown a small overflow pipe with adjustable weir 175 delivering into the tar chamber 181 to be described.

The water spilling out of the tank 169 is received in the reservoir 21 up to the water level indicated. This warm water serves as a jacket to keep warm the tank 169 and its contents, and the water may be drawn off for recirculation in the gas plant by means of a pipe 177 connected with a suitable pump. A water overflow pipe 178 is shown determining the level of the water in the reservoir.

The tar contents of the tank 169 may be pumped out through a pipe 180 which reaches down nearly to the bottom of the tank. This pipe leads upwardly to a tar well or chamber 181 which may be mounted to hang from the overhead beams or reservoir cover so as to be in fixed position rather than resiliently movable with the tank. Within the chamber 181 is shown a centrifugal tar pump 182 and above this is a casing 183 carrying the pump shaft, driven by a motor or turbine 184 mounted above the cover 168. The tar pump discharges by the rising pipe 186 which connects with a tar outlet pipe 187 leading to storage or elsewhere. In the pipes 186 or 187 is shown a bypass valve 188 which may be opened more or less to deliver back from the pump into the well 181 by a pipe 189 a portion of the pumped tar. For automatic operation the valve is shown as having an adjusting lever 190 connected by a link 191 with the edge of the tank 169. The inlet of pump 182 is spaced above the bottom of chamber 181 so that it can draw from the chamber as well as from pipe 180.

The resiliently suspended tank 169 and the automatically operated bypass valve 188 are so related that when the tar level in the tank rises higher than the desired normal the increased weight of the tank causes it to descend, compressing the springs 171, and pulling down on the link 191. This operates the bypass valve to close it further, thus reducing the quantity of tar which is bypassed and increasing the quantity delivered by the outlet 187 to storage. Conversely, when the tar level falls too low in the tank, the tank rises, opening further the valve, proportionately to the change of level, causing a greater quantity to be bypassed back into the well 181 and a lesser delivery to storage; this adjustment allowing a greater accumulation of tar in the tank and thereby a restoration of normal level.

In any embodiment of this invention the scroll inlet pipes or troughs may be supplementally supplied with hot water for occasions when the rate of liquor supply is inadequate for the desired volume and velocity for optimum separation in the scroll. For example, a water lifting device or pump and connection, valve controlled, from the reservoir 21, or from the water outlet pipe thereof, may lead directly to the mixer tank 40 or to the passages 15 to keep the scroll sufficiently supplied. So also separated hot tar may be pumped back to the mixer element or to the separator element and thus put through re-treatment for more complete separation.

There have thus been described liquid separation method and apparatus embodying the principles and attaining the objects of the present invention. Since many matters of operation, combination, construction and arrangement may be variously modified without departing from the principles it is not intended to limit the invention to such matters except to the extent set forth in the appended claims.

I claim:

1. Method of separating tar and water, combined as an emulsion and mixture, comprising flowing the emulsified and mixed liquids under forcing head and substantial speed from an inlet point through a curved passage of narrow width, of height many times its width and of length of travel many times its height, and thereby during such flow subjecting the heavy tar to extensive rolling and working movements against the concave side of the passage thereby to cause portions of the tar to release enveloped particles of the water, accompanied by progressive coalescence of the particles of the tar constituent into bodies continually increasing in size, and by progressive gravity classification of the onward flowing constituent liquids as they advance toward separate outlet points.

2. The method of separating an emulsion-andmixture combination of liquids of different specific gravity and viscosity, comprising continuously flowing the combined liquids in a general horizontal flow through a vertical walled spiral passage of narrow width, substantial height, relatively great length and extensive curvature of travel, while maintaining sufficiently great pressure and speed of flow to cause the heavier constituents progressively to shift laterally to the passage wall and by the flowing movement to rub or roll along such wall and progressively to coalesce into bodies of increasing size while subjected to the erosive action of the flow thereby to release from such bodies small particles of the lighter constituents and thereby to increase the specific gravity of such bodies, thus permitting progressive classification of the constituents in such passage with an accelerating action as the heavy bodies increase in size and specific gravity, and therebeyond flowing the classified constituents along different outlet passages.

3. The method of claim 2 and wherein the liquid combination contains water and tar, and the separating operation is preceded by the passing of the combination of liquids through a screen consisting of a plate with a multiplicity of perforations of the order of $\frac{1}{32}$ to $\frac{1}{16}$ inch size, thereby breaking up masses of the tar into shreds and liberating water therefrom thus increasing their specific gravity and enhancing efficiency of the separating action.

4. The separating method of claim 2 for a mixture-emulsion containing water with tars some heavier and some not heavier than water, and wherein preceding the steps stated in said claim, the mixture-emulsion is subjected to a preparatory mixing treatment, comprising passing it under head through a septum formed with a multiplicity of perforations of the order of $\frac{1}{16}$ inch size, not merely to exclude solids but to subject the flowing mixture-emulsion to a fine subdividing action, thereby to break up tar bodies of substantial size and release each constituent from the others, and to pass the reduced bodies along as a mixture of a relatively large number of small entrained bodies, of enhanced specific gravity, for prompt subjection to the coalescing and classifying steps of said claim.

5. The method of separating the liquid constituents of a mixture-emulsion containing heavier and notably viscous constituents, in combinations with lighter and less viscous constituents, wherein the mixture-emulsion is subjected first to a mixing treatment, comprising passing all said constituents through a perforated screen consisting of a thin wall having a multiplicity of holes of the order of $\frac{1}{16}$ inch diameter to subject the mixture-emulsion to a subdividing action, thereby to break up bodies of substantial size and release inclusions of each constituent from the others, and therebeyond to pass the reduced bodies along as a mixture of a relatively large number of small entrained bodies; and second, subjecting the treated constituents to a classifying action to cause separating of the treated constituents according to their specific gravities.

6. Method of separating liquids from a mixture including water and other constituents one of which is viscous and heavier than water, another being lighter than water, comprising preliminarily passing the mixture through a screen having a multiplicity of perforations of the order of $\frac{1}{32}$ to $\frac{1}{16}$ inch to subject the flow to a fine subdividing and reuniting action thereby to disrupt bodies of the heavier constituent and reduce them to small bodies immersed in the water, and thereupon flowing the combined liquids with substantial speed through a long and narrow curved passage, thereby subjecting the liquids to extensive diversion of flow direction thereby to cause progressive coalescence of the particles of the heavier constituent into continually growing bodies of increasing specific gravity, so that the constituents become adapted to effective progressive self-classification according to their differing specific gravities.

7. In the method of separating liquids of differing specific gravity, the steps preceding classification of the constituents, of subjecting the heavier liquid masses to a mechanical wiping action to spread them, thus releasing lighter constituents, and passing the entire flow through a perforated screen thus shredding the masses of the heavier constituent and further releasing enveloped particles of the lighter liquid, and thereby increasing the gravity of such masses for better subsequent classification.

8. Apparatus for separating liquids of differing specific gravity and viscosity, comprising a mixer having a perforated screen with a multiplicity of perforations of the order of $\frac{1}{32}$ inch through which the liquids are passed thereby causing fine subdivision and shredding of masses of the heavy liquid and release of a lighter liquid therefrom, and therebeyond, a spiral walled duct containing a spiral liquid flow passage, with extended length for substantial distance of flow therethrough, and with extensive changes of direction due to the spiral form, whereby coalescence is progressively effected of the particles of each of the constituent liquids by contact and rolling movements during advance through the duct; and a plurality of outlets selectively taking off at different points the separated and classified liquids.

9. In liquid separating apparatus for a liquid containing water and a heavier viscous liquid, a preliminary mixer comprising a vessel having a finely perforated bottom and within the vessel a rotary wiper fitted with pitched blades to wipe over the bottom and spread the more viscous constituents thereover, whereby the mixed liquids are caused to pass through the perforations thereby becoming subdivided into shreds to be reunited beyond the bottom for gravity classification.

10. In liquid separating apparatus a preliminary mixer comprising a perforated screen through which the mixed liquids are flowed and subdivided and a mechanically operated wiper element playing over such perforated screen, whereby viscous liquids are shredded in passing through the perforations, in combination with a spiral duct through which the reunited liquids are thereupon flowed for final separation.

11. A liquid separating element comprising a spiral duct and within its center a helical inlet channel delivering into the spiral duct.

12. A liquid separating element comprising a spiral duct and within its center a helical inlet channel delivering into the spiral duct, with selective delivery, comprising an upper peripheral delivery mouth for heavy constituents and a lower mouth for lighter constituents.

13. In liquid separating apparatus a reservoir, a tank immersed therein and having means supporting it for vertical self-adjustment therein, liquid separating means in the tank, a suction pipe for withdrawing heavy liquid from the tank lower part, suction pump means to suck the heavy liquid through said pipe and force it through a discharge pipe, a bypass beyond the pump means for returning part of such liquid to a point ahead of the pump means, a valve in the bypass, and a connection actuated by the vertical adjustment of the tank and extending to said valve whereby the excess accumulation of heavy liquid by lowering such tank operates to reduce the bypass action and thus increase withdrawal.

14. The method of separating the liquid constituents of a mixture-emulsion containing tars of varying viscosity and specific gravity, in various combinations with water, wherein the mixture-emulsion is subjected first to a mixing treatment, comprising passing all said constituents through a perforated screen consisting of a thin wall having a multiplicity of holes of the order of $\frac{1}{16}$ inch diameter, whereby the tars undergo a mixing action wherein the more viscous tars traverse the screen perforations more slowly than the less viscous tars and the two are thus brought into mutual contact and caused to coalesce; and wherein the so treated constituents are next subjected to a classifying action to cause separating of the treated constituents according to their specific gravities.

15. In the method of separating immiscible liquids combined in a mixture of miscible components with an immiscible component, wherein the miscible components comprise components of various specific gravities from lighter than to heavier than the immiscible component, the step, preceding classification, of subjecting the mixture to an internal rearranging action by causing the miscible components mutually to contact and combine in a form readily susceptible to classification, namely, by passing the mixture downwardly through a perforated septum and promoting such passage by causing a rotary spreading blade to spread the mixture over the surface of the septum, while accompanied by an action of the spreading blade in engaging the lighter components and transporting them downwardly on to the surface of the perforated septum there to contact and coalesce with the heavier non-floating components before and during passage through the perforations of such septum.

16. Apparatus for separating a mixture of liquids comprising miscible components of varying degrees of viscosity and a component immiscible therewith, comprising in combination with a vessel for gravity classification of the liquids, of a means for preparatory treatment of the mixture before such classification, consisting of a screen located in the path of liquid flow and having a multiplicity of perforations substantially of the order of one sixteenth inch in size through which all such components pass, and a mechanical means fitted at the inlet side of said screen operating continuously to wipe over the surface thereof and thereby to spread the viscous components thereover; whereby the miscible viscous components are caused by the wiping action and liquid flow to traverse such perforations with different speeds according to their viscosity and thereby to be brought into mutual contact and caused to coalesce into a combined viscous component readily separable by gravity from the immiscible component of the mixture.

17. In the method of separating from water various accompanying liquids including tars heavier than water, tars lighter than water, combinations of light and heavy tars, and various emulsions of tars with water, which combinations and emulsions are of indifferent flotation and therefore not readily classifiable, the treatment preceding classification consisting in flowing the entire mixture downwardly through a perforated screen, while operating above the screen a bladed wiper closely spaced from the screen surface and having movements extending above the surface of the liquid mixture, whereby the aforesaid combinations and emulsions of heavy and light tars which are of indifferent flotation are carried by the water flowing through the screen down to the screen surface, where, by the action of the wiper, they are brought into contact with the tar heavier than water, which latter sinks to the surface of the screen and in contact with the tars lighter than water which adhere to the blade of the wiper and by the blade are carried down to contact the other tars, and all are combined and spread and wiped in a thin film over the surface of the screen so that particles of water are separated from the tar by the rubbing and spreading action of the wiper thereby increasing the specific gravity of the tar film on the screen, and of the finely divided tar masses which are forced through the perforations of the screen by the pressure and flow of the superimposed mixture, thereby producing a condition of treated mixture of improved susceptibility of classification.

18. A liquid separating element comprising a substantially upright spiral duct and within its inner convolution a downwardly trending helical inlet channel, said helical channel having an outer wall formed with a descending series of take-off mouths delivering into the spiral duct, and the spiral duct wall at each mouth being connected with so as to constitute a continuation of the channel outer wall; whereby the incoming heavier liquid constituents, flowing to and along such outer wall, are delivered from the inlet channel to the spiral duct through the higher of such mouths, while the lighter constituents flowing therebelow are delivered through the lower of such mouths.

19. The method of treating a mixture-emulsion of immiscible liquid constituents of different specific gravities and viscosities for separation of such constituents, consisting in continuously flowing a stream of the mixture-emulsion downwardly through a helical channel at sufficient velocity to cause the heavier constituents to shift progressively outward to the outer boundary wall of such channel, and during such downflow first removing from such stream the heavier constituents at a peripheral take-off delivering from the helical channel at upper levels, and therebelow delivering from such channel the remaining lighter constituents by take-off mouths at lower levels, flowing all of such constituents into the inner convolution of a common spiral passage surrounding the helical channel and of sufficient height to receive from such take-off mouths the several constituents with the heavier ones in general at levels above the lighter ones, continuing the flow of all the constituents along such spiral passage thereby to cause the heavier constituents to spread along upon the concave outer boundary wall thereof while moved or rolled along as in masses or waves by the forcible flow of the lighter constituents, during which advance in such spiral passage the heavier constituents progressively descend from their initial higher level, and during which advance the bodies or particles of lighter constituents that are confined and entrained within the advancing masses of heavier constituents, by progressive subjection to the rolling and erosive action of the faster flow of lighter constituents, are caused to contact and coalesce with each other and to increase in size and to be finally disrupted and released from the heavier constituents into the stream of lighter constituents, whereby the waves or masses of advancing heavier constituents progressively increase in specific gravity and accelerate in their descent along the passage wall until delivered into an underneath accumulation or stratum of such heavier constituents, below the stream of lighter constituents, and therebeyond flowing the respective separated liquids along different outflow passages.

20. The method of treating a mixture-emulsion of immiscible liquid constituents of different specific gravities and viscosities for separation of such constituents, consisting in continuously flowing the stream of mixture-emulsion downwardly through a perforated screen while operating a wiper above the screen to cause mutual contact of different constituents and thus to prepare the mixture-emulsion for better classification, and thereafter continuously flowing the prepared stream downwardly through a helical channel at sufficient velocity to cause the heavier constituents to shift progressively outward to the outer boundary wall of such channel, and, during such downflow, first removing from such stream the heavier constituents at a peripheral take-off delivering from the helical channel at upper levels, and therebelow delivering from such channel the remaining lighter constituents by a take-off at lower levels, flowing all such constituents into the inner convolutions of a spiral passage of sufficient height to receive from such take-offs the several constituents with the heavier ones above the lighter ones, continuing the onward flow of all the constituents within such spiral passage thereby to cause the heavier constituents to be advanced along upon the concave outer boundary wall of the passage by the forcible flow of the lighter constituents, during which prolonged advance in such spiral passage the heavier constituents progressively descend from their initial higher level, and during which advance the bodies or particles of lighter constituents that are entrained within the advancing heavier constituents, by progressive subjection to the rolling and erosive action of the faster flow of lighter constituents, are caused to contact and coalesce and thus increase in size, and to be finally disrupted and released into the stream of lighter constituents, whereby the advancing heavier constituents progressively increase in specific gravity and so accelerate in their descent along the passage wall until delivered downwardly below the stream of lighter constituents, and eventually flowing away the respective separated liquids along different passages.

JAMES F. HUNTER.